(12) United States Patent
Scherbarth

(10) Patent No.: US 8,634,065 B2
(45) Date of Patent: Jan. 21, 2014

(54) METHOD FOR OPERATING A JAMMING LASER IN A DIRCM SYSTEM IN A MANNER THAT IS SAFE FOR EYES

(75) Inventor: Stefan Scherbarth, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 140 days.

(21) Appl. No.: 13/389,216

(22) PCT Filed: Jul. 16, 2010

(86) PCT No.: PCT/DE2010/000820
§ 371 (c)(1),
(2), (4) Date: Feb. 29, 2012

(87) PCT Pub. No.: WO2011/015175
PCT Pub. Date: Feb. 10, 2011

(65) Prior Publication Data
US 2012/0154198 A1 Jun. 21, 2012

(30) Foreign Application Priority Data
Aug. 7, 2009 (DE) .......................... 10 2009 036 694

(51) Int. Cl.
*G01C 3/08* (2006.01)
(52) U.S. Cl.
USPC .......................... 356/5.01; 356/3.01; 356/4.01
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 3,732,412 A | 5/1973 | Tyroler | |
| 5,612,503 A | 3/1997 | Sepp | |
| 5,837,918 A | 11/1998 | Sepp | |
| 6,369,885 B1 | 4/2002 | Brown et al. | |
| 6,723,974 B1 | 4/2004 | Sepp | |
| 2006/0000987 A1* | 1/2006 | Weber | 250/504 R |
| 2011/0311224 A1* | 12/2011 | Scherbarth | 398/39 |

FOREIGN PATENT DOCUMENTS

| | | |
|---|---|---|
| DE | 44 02 855 A1 | 8/1995 |
| DE | 44 44 636 A1 | 6/1996 |
| DE | 44 44 637 A1 | 6/1996 |
| DE | 198 04 720 A1 | 7/2003 |
| WO | WO 97/21261 A1 | 6/1997 |

OTHER PUBLICATIONS

Mark Rutherford, "Window or aisle, chicken or beef, laser protection or SAM in the fuselage?", Military Tech, Aug. 31, 2007, XP002608205 (Two (2) pages).
International Search Report including English language translation dated Nov. 16, 2010 (Six (6) pages).

* cited by examiner

*Primary Examiner* — Luke Ratcliffe
(74) *Attorney, Agent, or Firm* — Crowell & Moring LLP

(57) ABSTRACT

A method for operating a jamming laser in a DIRCM system on board an aircraft in a manner that is safe for eyes. The energy radiated by the jamming laser since the start of combat is determined, depending on the aircraft's flight condition, a limit is determined for the permitted energy radiation, where the limit corresponds to a laser protection distance to be observed for this flight condition, and when the limit is reached, radiation is suppressed.

4 Claims, 1 Drawing Sheet

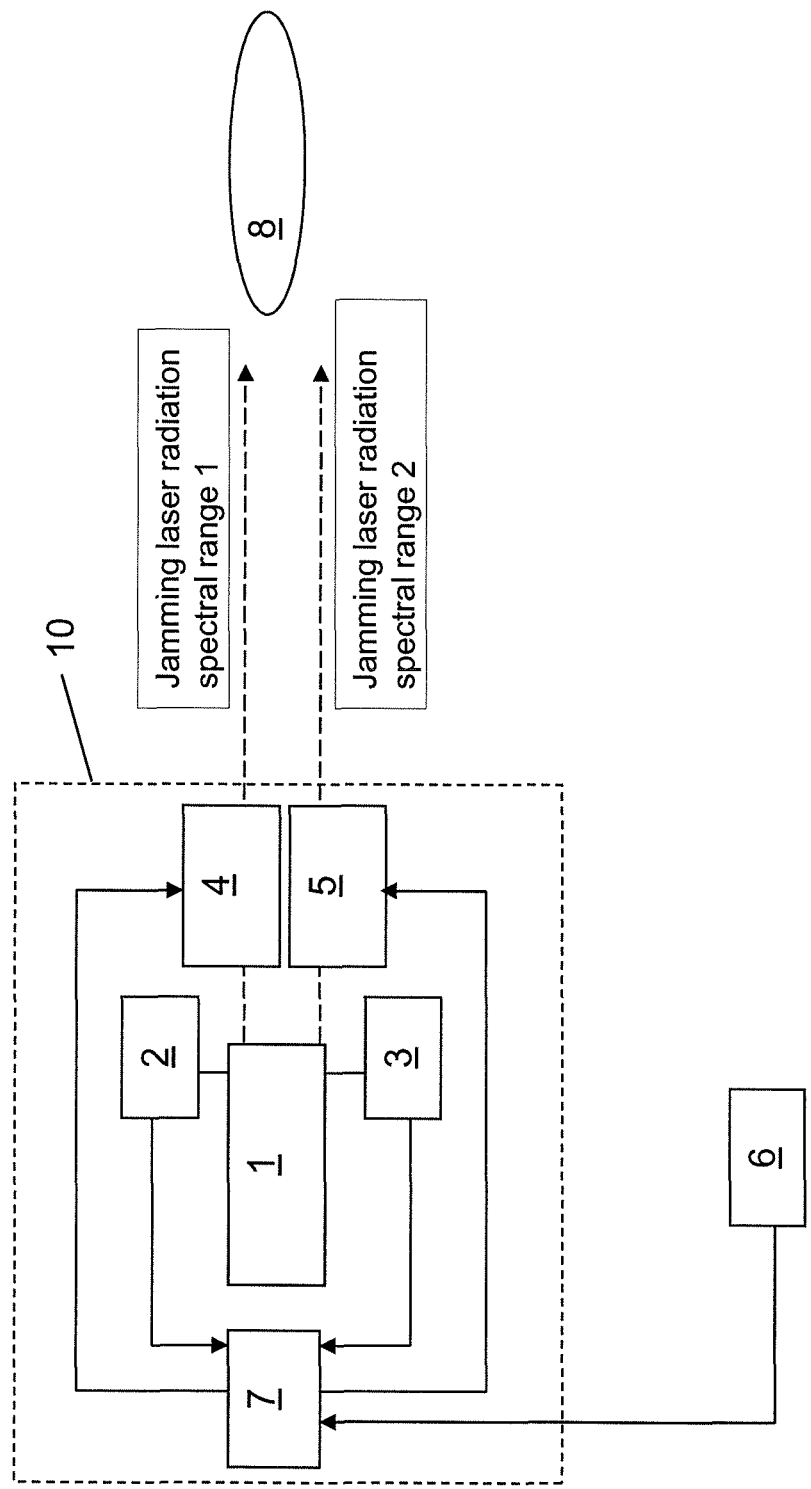

METHOD FOR OPERATING A JAMMING LASER IN A DIRCM SYSTEM IN A MANNER THAT IS SAFE FOR EYES

BACKGROUND AND SUMMARY OF THE INVENTION

The invention relates to a method for operating a jamming laser in a DIRCM system on board an aircraft in a manner that is safe for eyes.

Military and, increasingly civilian aircraft, are at risk of attack by surface-to-air missiles (SAMs). The most common SAMs are so-called MANPADS (Man-Portable Air Defense Systems) with a seeker head operating in the infrared spectral range.

One possible countermeasure is the emission of directed infrared laser radiation modulated with a suitable jamming sequence against the oncoming SAM, in order to jam its seeker head and cause it to miss its target. Systems of this kind are known as DIRCM (Directional Infrared Countermeasures) systems and are disclosed, for example, in German Patent Document DE 4402855 A1 and U.S. Pat. No. 6,369,885 B1.

In order for it to be effective, the intensity of the jamming radiation generated by the DIRCM system must be significantly higher than the infrared radiation from the aircraft being protected. Using jamming intensities that are too low is counterproductive, as it makes it easier for the oncoming SAM to locate its target.

Furthermore, the jamming radiation must fall within the wavelength range detected by the seeker head of the oncoming SAM. Since commonly found MANPADS use different spectral ranges within the infrared spectrum, a correspondingly broad range of this spectrum must therefore be contained in the DIRCM jamming radiation.

A laser modulated with a suitable jamming sequence is normally used to generate this jamming radiation, the laser being capable of simultaneously emitting a plurality of wavelengths distributed over the infrared spectrum.

The high laser intensities required result in a laser safety problem. The eye safety range of a DIRCM system, for example, is up to several hundred meters according to the European Laser Safety Regulation EN 60825-1. It is, therefore, important to ensure that there are no personnel without laser protection within this laser safety distance when operating the DIRCM system. This leads to restrictions on the licensing and use of a DIRCM system, particularly in situations such as take-off and landing, when the potential threat is greatest and protection from a DIRCM system is therefore most important.

In order to ensure that the required laser safety range is observed, restrictions on use are provided with the help of additional sensor technology. Hence, for example, in accordance with ANSI standard Z 136.6-2005, Section 4.2.7.2 and Section 10.5.9 (Laser Institute of America), the laser is switched off when the aircraft is at an altitude below the laser's NOHD (Nominal Ocular Hazard Distance) or ENOHD (Extended Nominal Ocular Hazard Distance). The altitude is normally determined in aircraft by a radar altimeter. The disadvantage of this method is that below an altitude corresponding to the NOHD or ENOHD, the aircraft is left unprotected by a DIRCM, right at the very moment when the threat is greatest.

In the case of military applications and licenses, it is usually the pilot's responsibility to block activation of the laser system if he cannot rule out the possibility that personnel within the laser safety range could be at risk. However, this approach is not acceptable for civilian applications and licenses. Because many military aircraft are now also licensed and used for civilian purposes, this approach represents a major disadvantage for military aircraft too.

Exemplary embodiments of the present invention provide a method that enables a DIRCM system to be operated in a manner that is safe for eyes, wherein any restrictions on the use of the DIRCM system resulting from this are to be minimized. Furthermore, the equipment costs are to be kept low. In particular, the method is also be applicable to DIRCM systems, which do not have the design capability to receive back reflections from the laser light transmitted itself (open-loop DIRCM).

Due to its optical system and the intensities required for operation, the DIRCM system requiring protection has a laser safety distance of a few hundred meters (e.g. ENOHD in accordance with EN 60825-1) with an operationally required maximum laser deployment time of several seconds. The fixed laser safety distance resulting from these properties is referred to below as the "original laser safety distance" of the DIRCM system.

The jamming laser according to the invention is provided with a locking device, which can suppress the emission of the laser radiation. This locking device can act through the laser beam modulation mechanism already present in the DIRCM system or it may also be realized independently of this as a selective, mechanical radiation blocking device, for example.

Furthermore, the DIRCM system according to the invention is provided with a measuring device, which continuously determines the laser energy radiated since the start of combat by the DIRCM in each case. This may involve the monitor diodes normally present at the laser source, for example, or continuous evaluation of the modulation signal.

Due to the laser intensities and modulations used in a DIRCM, it emerges when determining the necessary laser protection distance D that this is a direct, monotonously rising function of the total energy radiated since the start of combat, in other words, D=D (energy). Conversely, for each laser protection distance D to be observed, the maximum possible value for the radiated energy can also be determined, for which the permitted laser radiation in the safety distance D in accordance with EN 60825-1 is not exceeded.

The eye-safe operation of the DIRCM system is now achieved according to the invention, in that the maximum possible value for the radiated energy is determined depending on the altitude of the aircraft fitted with the DIRCM, such that the corresponding laser protection distance is smaller than the current altitude above ground measured by a radar altimeter, for example. The laser radiation is then suppressed by means of the locking device, when the measured energy value reaches the maximum value determined for the altitude.

In the preceding example, the maximum value of the permitted energy radiated was determined depending on the current altitude. It is generally the case that the maximum value of the radiated energy may depend on the aircraft's flight condition. This applies, for example, when individual safety distances D are required for each different stage of the flight. Hence, the take-off and landing runways in civil aviation are safety zones up to a specific width, which must be kept free of personnel. As an aircraft hovers over the runway, the safety distance D to be protected would therefore be the shortest distance to the limit of this safety zone, for example. Based on a safety zone with a width of 30 m to the right and left of the runway and an altitude of 20 m, this produces, for example: $D=(30^2+20^2)^{1/2}=36$ m.

The DIRCM system operated according to the invention at all times fulfills the requirements of ANSI Z 136.6-2005, Section 4.2.7.2 and Section 10.5.9 (Laser Institute of America), i.e., the operation of this system is eye-safe. However, the cost of this is the restriction that the laser emission and therefore also possible engagement with an attacking SAM may have to be suspended for laser safety reasons.

However, this restriction on use is minimal due to the method according to the invention. In the above example, the minimum height below which combat is no longer permitted is considerably lower than the original laser safety distance of a DIRCM not fitted according to the invention.

A DIRCM system normally radiates a plurality of wavelengths in the infrared range. When calculating the original laser safety distance, the ENOHD for wavelengths that are detected by customary optical instruments, such as binoculars, must therefore be taken into account in accordance with EN 60825-1. These wavelengths in the near-infrared range are referred to as spectral range 1 below. For longer wavelengths in the mid- and far-infrared range, only the NOHD, which is significantly smaller than the ENOHD, need be taken into account in accordance with EN 608251. This wavelength range is referred to as spectral range 2 below.

In an advantageous embodiment of the invention, the spectral ranges 1 and 2 distinguished by the Laser Safety Regulation undergo separate treatment, in order to further minimize any necessary restriction on use due to laser protection reasons. This is explained in greater detail using the following exemplary embodiment.

The jamming laser in an embodiment of this type is provided with a locking device for each of the spectral ranges 1 and 2, both of which can suppress the emission of the laser radiation independently of one another. These locking devices may act through the laser beam modulation mechanism already present in the DIRCM system or they may also be realized independently of this as a selective, mechanical radiation blocking device, for example.

Accordingly, the DIRCM system is now provided with two measuring devices, which each continuously determine the laser energy radiated since the start of combat by the DIRCM independently for the individual spectral ranges 1 and 2. This may happen through the aforementioned monitor diodes or through continuous evaluation of the modulation signal. The laser energies determined are referred to below as energy 1 and energy 2.

Due to the laser intensities and modulations used in a DIRCM, it emerges when determining the necessary laser protection distance D that this is a direct, monotonously rising function of the energy 1 and energy 2 radiated in total since the start of combat, in accordance with EN 60825-1, in other words D=D (energy 1, energy 2). Conversely, for each laser protection distance D to be observed, the possible maximum value pairs for energy 1 and energy 2 may also be determined, for which, taken together, the permitted laser radiation in the safety distance D according to EN 60825-1 is not exceeded.

The eye-safe operation of the DIRCM system is achieved in accordance with this embodiment, such that the possible maximum value pairs for energy 1 and energy 2 are determined depending on the altitude of the aircraft fitted with the DIRCM, such that the laser protection distance is smaller than the current altitude above ground measured by a radar altimeter, for example. By means of the locking devices, the laser radiation in spectral range 1 is then suppressed when the measured value for energy 1 reaches the maximum value determined for the altitude; the laser radiation in spectral range 2 is suppressed when the measured value for energy 2 reaches the maximum value determined for the altitude.

The maximum values for energy 1 and energy 2 ensure that the total radiation in the required safety distance D does not exceed the permitted value according to Laser Safety Regulation EN 60825-1. When determining this total permitted radiation value in accordance with the Laser Safety Regulation, the energies radiated in the two spectral ranges under consideration are applied with different weighting factors, as required by the Laser Safety Regulation. A division of the total permitted radiation value between the two spectral ranges may be stipulated, particularly according to operational deployment conditions, e.g. the type of SAMs that will probably be involved in combat, etc.

The two maximum values for energy 1 and energy 2 are stipulated in advance depending on distance, such that the radiation in spectral range 1 is suppressed before that in spectral range 2, so that there is still a sufficient, eye-safe radiation budget for combat in spectral range 2.

At low altitudes, the limit for energy 1 may also be around 0, so that for laser protection reasons combat is only still possible in spectral range 2.

At even lower altitudes, the limit for energy 2 will also be around 0, so that no combat is possible for laser protection reasons. However, if a DIRCM has a suitable optical design, this altitude can be kept very low (in the range of a few meters).

Due to the different treatment of the two spectral ranges, the restriction on use that is necessary for laser safety reasons is significantly minimized and relates almost exclusively to combat in spectral range 1, which is only possible from a low minimum height during take-off and down to a low minimum height during landing. This minimum height is, in particular, significantly lower than the original laser safety distance of a DIRCM system not fitted according to the invention.

A general advantage of the method according to the invention is that the energies actually radiated in a jamming sequence are used to determine the switch-off limits. Where a jamming sequence has a low duty cycle, this leads to a significantly later switch-off than when the maximum possible laser radiation output is used to determine the switch-off limits or laser safety distance. In this way, restrictions on use are likewise minimized.

Since no change in radiation intensity and jamming laser modulation is made without activating the locking device, there are no further functional restrictions on the DIRCM system protected according to the invention.

The equipment costs of implementing the method according to the invention can be kept low.

Furthermore, the method according to the invention can also be used for DIRCM systems, which do not have the design capability to receive back reflections from the laser light transmitted itself (open-loop DIRCM).

BRIEF DESCRIPTION OF THE DRAWING FIGURE

The sole FIGURE is a schematic representation of the components of a DIRCM system in accordance with exemplary embodiments of the present invention.

DETAILED DESCRIPTION

The invention is explained in greater detail using an exemplary embodiment with reference to a FIGURE. This shows a schematic representation of the components of a DIRCM system 10 relevant to the implementation of the method according to the invention. The FIGURE shows an embodiment in which a distinction is made between the two spectral ranges 1 and 2.

The DIRCM system shown comprises the jamming laser 1 for engaging an oncoming SAM 8. The altitude above ground is determined continuously, e.g. by a radar altimeter 6. The measuring devices 2 and 3 continuously determine the energy radiated in spectral range 1 and 2 since the start of combat. Using this data, the control unit 7 then generates cut-off signals for the two locking devices 4 and 5 to switch off the laser emission in the spectral range 1 and 2 of the laser, so that the maximum permitted radiation on the ground according to EN 60825-1 is at no time exceeded.

The switch-off in this case is performed by the control unit 7 in accordance with previously defined, distance-dependent limits, such that even before the permitted radiation on the ground is reached, the locking device 4 is triggered, so that there is still a sufficient budget of permitted radiation available for combat in spectral range 2, before this too is interrupted by the locking device 5.

The locking devices 4 and 5 act in accordance with the embodiment shown in the FIGURE, in that they act directly on the laser beam, in the form of a beam interruption, for example. Alternatively, the locking device may also act by influencing the laser's modulation device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a jamming laser in a DIRCM system on board an aircraft in a manner that is safe for eyes, the method comprising:

determining an amount of energy radiated by the jamming laser since the start of combat;

determining, depending on flight condition of the aircraft, a limit for permitted energy radiation, wherein the limit corresponds to a laser protection distance to be observed for the flight condition of the aircraft; and suppressing radiation from the jamming laser when the limit is reached.

2. The method as claimed in claim 1, wherein the amount energy radiated by the jamming laser since the start of combat is determined separately for near- and mid-/far-infrared range, depending on the aircraft's flight condition, two separate limits are determined for permitted energy radiation for the near- and mid-/farinfrared range, wherein a total of the limits corresponds to a laser protection distance to be observed for the flight condition of the aircraft, when the limit is reached for the near-infrared range, radiation in the near-infrared range is suppressed, and when the limit is reached for the mid-/far-infrared range, radiation in the mid/far-infrared range is suppressed.

3. The method as claimed in claim 2, wherein the limit for the near-infrared range is small enough for eye-safe radiation by the jamming laser in the mid-/far-infrared range to still be possible for a few seconds after radiation has been suppressed in the near-infrared range.

4. The method as claimed in claim 1, wherein the flight condition of the aircraft is an altitude of the aircraft.

* * * * *